United States Patent
Dye et al.

[19]

[11] Patent Number: 5,817,234
[45] Date of Patent: Oct. 6, 1998

[54] FLUID FILTER AND METHOD FOR ASSEMBLING SAME

[75] Inventors: Richard Dye, Warren, N.J.; John Lowsky, Fayetteville, N.C.

[73] Assignee: Advanced Performance Technology, Inc., Lugoff, S.C.

[21] Appl. No.: 691,024

[22] Filed: Aug. 7, 1996

Related U.S. Application Data

[63] Continuation-in-part of Ser. No. 426,748, Apr. 13, 1995, Pat. No. 5,667,678.

[51] Int. Cl.$^6$ .................................................. B01D 27/08
[52] U.S. Cl. .......................... 210/232; 210/440; 210/443; 210/450; 210/455
[58] Field of Search ..................................... 210/232, 440, 210/443, 444, 450, 455; 55/500, 502, 521

[56] References Cited

U.S. PATENT DOCUMENTS

| | | |
|---|---|---|
| Re. 34,031 | 8/1992 | Thomsen et al. . |
| Re. 34,050 | 9/1992 | Thomsen et al. . |
| 692,377 | 2/1902 | Speer . |
| 1,690,358 | 11/1928 | Babitch . |
| 2,083,005 | 6/1937 | Czarnecki . |
| 2,202,403 | 5/1940 | Sandberg . |
| 2,563,548 | 8/1951 | Plante . |
| 2,858,026 | 10/1958 | Lorimer . |
| 2,932,400 | 4/1960 | Scavuzzo . |
| 3,000,506 | 9/1961 | Hultgren . |
| 3,265,213 | 8/1966 | Decker et al. . |
| 3,297,160 | 1/1967 | Humbert, Jr. . |
| 3,333,703 | 8/1967 | Scavuzzo et al. . |
| 3,485,380 | 12/1969 | Offer et al. . |
| 3,502,218 | 3/1970 | Tuffnell et al. . |
| 3,502,221 | 3/1970 | Butterfield . |
| 3,722,691 | 3/1973 | Francois . |
| 4,052,307 | 10/1977 | Humbert, Jr. . |
| 4,253,954 | 3/1981 | Midkiff et al. . |
| 4,314,903 | 2/1982 | Hanley . |
| 4,324,660 | 4/1982 | Peyton et al. . |
| 4,369,113 | 1/1983 | Stifelman . |
| 4,676,895 | 6/1987 | Davis . |
| 4,692,445 | 9/1987 | Church et al. . |
| 4,702,790 | 10/1987 | Hogh et al. . |
| 4,721,563 | 1/1988 | Rosaen . |
| 4,740,299 | 4/1988 | Popoff et al. . |
| 4,824,567 | 4/1989 | Thurman . |
| 4,836,923 | 6/1989 | Popoff et al. . |
| 4,956,089 | 9/1990 | Hurst . |
| 4,976,852 | 12/1990 | Janik et al. . |
| 4,992,166 | 2/1991 | Lowsky et al. . |
| 4,999,108 | 3/1991 | Koch et al. . |

(List continued on next page.)

FOREIGN PATENT DOCUMENTS

| | | |
|---|---|---|
| 229092 | 8/1963 | Austria . |
| 0221675 | 5/1987 | European Pat. Off. . |
| 2082912 | 12/1971 | France . |
| 59-70709 | 11/1982 | Japan . |
| 982548 | 2/1965 | United Kingdom . |
| 1355832 | 6/1974 | United Kingdom . |

Primary Examiner—W. L. Walker
Attorney, Agent, or Firm—Staas & Halsey

[57] ABSTRACT

A one-piece plastic injection molded filter housing has a first end and a second open end. An injection molded end plate member includes a circumferential annular flange, and an inward annular projection. Opposing, one-piece plastic upper and lower end caps include spaced flanges to receive the respective ends of a filter media therebetween. The upper end cap also includes an upper annular projection. The upper end cap is mechanically, removably connected to the end plate member via corresponding threads or a protuberance/recess interference fit combination. The end plate member is fixedly connected to the housing via a rib that fits into a recess on the housing via an interference fit, or by spin welding. The method for manufacturing the filter includes the following steps: connecting a plastic upper end cap to the media to form a media element; removably, mechanically connecting the upper end cap to the end plate member; and fixedly connecting the end plate member to the second end of the housing.

46 Claims, 10 Drawing Sheets

U.S. PATENT DOCUMENTS

| | | |
|---|---|---|
| 5,017,285 | 5/1991 | Janik et al. . |
| 5,035,797 | 7/1991 | Janik . |
| 5,066,391 | 11/1991 | Faria . |
| 5,084,170 | 1/1992 | Janik et al. . |
| 5,096,575 | 3/1992 | Cosack . |
| 5,098,559 | 3/1992 | Mack et al. . |
| 5,104,537 | 4/1992 | Stifelman et al. . |
| 5,114,572 | 5/1992 | Hunter et al. . |
| 5,118,417 | 6/1992 | Deibel . |
| 5,128,034 | 7/1992 | Kool . |
| 5,137,557 | 8/1992 | Behrendt et al. . |
| 5,171,430 | 12/1992 | Beach et al. . |
| 5,182,015 | 1/1993 | Lee . |
| 5,186,829 | 2/1993 | Janik . |
| 5,211,846 | 5/1993 | Kotte et al. ............................ 210/232 |
| 5,236,579 | 8/1993 | Janik et al. . |
| 5,238,717 | 8/1993 | Boylan . |
| 5,259,953 | 11/1993 | Baracchi et al. . |
| 5,277,157 | 1/1994 | Teich . |
| 5,342,519 | 8/1994 | Friedman et al. . |
| 5,374,355 | 12/1994 | Habiger et al. . |
| 5,433,241 | 7/1995 | Robinson . |
| 5,456,834 | 10/1995 | Bowlsbey . |
| 5,484,466 | 1/1996 | Brown et al. . |

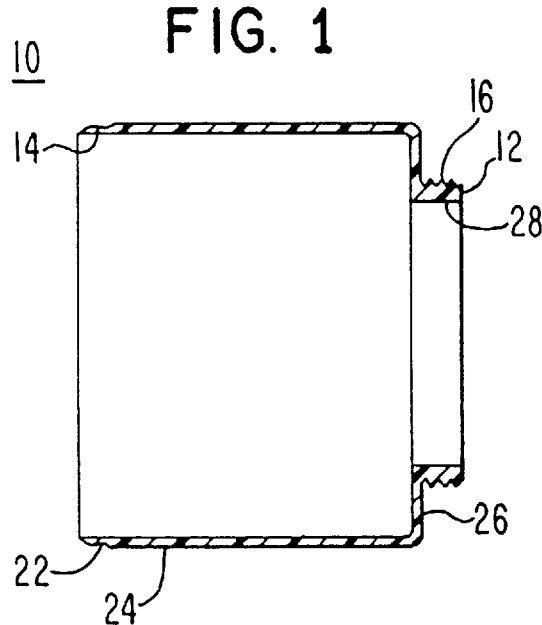
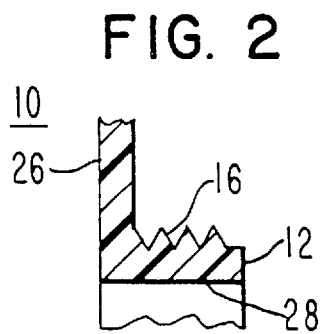
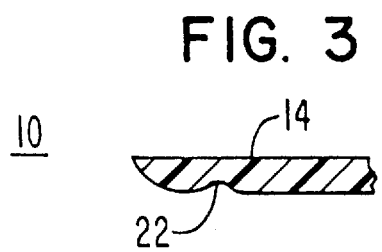
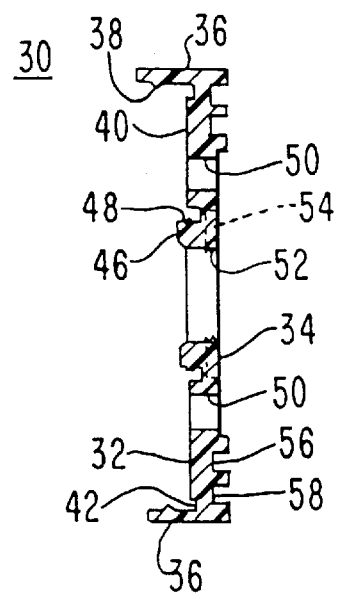
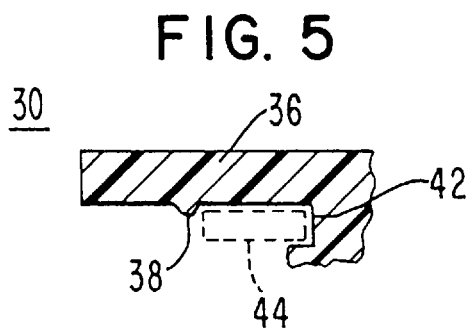
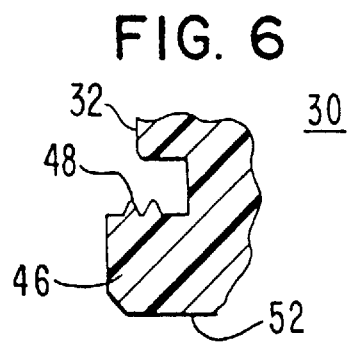

FLUID FILTER AND METHOD FOR ASSEMBLING SAME

This is a continuation-in-part application of application Ser. No. 08/426,748, entitled "FLUID FILTER AND METHOD FOR ASSEMBLING SAME" and filed Apr. 13, 1995, now U.S. Pat. No. 5,667,678, issued Sep. 16, 1997.

BACKGROUND OF THE INVENTION

This invention relates to fluid filters and, more particularly, to a fuel filter that can separate contaminating water from the fuel, and a method for manufacturing such a filter.

The filter art includes various filters that can separate water from fuel, known as fuel water separators. See, e.g. U.S. Pat. Nos. 3,297,160; 3,502,218; 4,253,954; 4,676,895; and 4,740,299. These filters are often used in diesel fuel systems for trucks.

U.S. Pat. No. 4,740,299, in particular, relates to a metal housing for a paper filter media that is directed to separating water from fuel. More specifically, this filter includes in one embodiment the following components: a drawn cylindrical metal housing having two open ends; a plastic, threaded adaptor ring fixedly and sealingly received at one open end via a structural adhesive; a cylindrical filter element placed within the housing, made of pleated filter media paper surrounding a metal center tube, and terminated by metal circular end caps; a thick metal end plate including a threaded central outlet aperture and radial inlets; one of several gasket retainers, depending upon which gasket diameter is required, is welded to the exterior of the end plate, the end plate/retainer combination being attached to the other open end of the filter housing by seaming the interface thereof; a rubber grommet between one of the end caps and the end plate; a gasket received in the gasket retainer; and a separate plastic collection bowl screwed onto the threaded adaptor ring. The complete filter is screwed onto a threaded post formed on a mount in a fuel line via the threaded central aperture of the end plate.

During use, which occurs at about up to 40 p.s.i., diesel fuel is introduced through the mount and circulated inside-out, relative to the media. The conventional water-stripping media causes water present in the diesel fuel to coalesce on the outside of the media. The bowl collects the separated water after it runs down along the outside of the media and across the adaptor. When the filter has reached its capacity, the old filter is removed from the mount, the bowl is removed from the filter housing and emptied, a new filter housing is screwed onto the mount, and the same bowl is screwed on the new filter housing.

The manufacturing steps for producing such a filter include basically the following: the housing is drawn; media paper is pleated, cured, cut and clipped to form a cylinder; the center tube is inserted in the media cylinder and the end caps are attached to the media via Plastisol and cured to form a media element; the adaptor receives the adhesive, which is very expensive, and the adaptor is positioned in the housing; the rubber grommet is added to the element and the element is placed in the housing; and the end plate/gasket retainer combination is formed and sealed to the other end of the housing.

This filter, since it includes numerous parts that must be stamped, molded and/or seamed, and since it depends upon a multi-step manufacturing process, is, relatively expensive to produce.

Further, this type of filter is relatively environmentally unfriendly. That is, the filter includes metal, paper, rubber and plastic components. It is very costly, time-consuming and labor intensive to recycle such a multi-component product after use. Many states are currently considering steps to tax the disposal of used metal oil filters or simply refuse to dispose of same in landfills.

Further, the media element is effectively squeezed in place between the end plate and adaptor ring, when the end plate is located on the filter housing and fixedly attached thereto via crimping of the housing edge and the gasket retainer periphery. This squeezing can cause the pleats in the paper media to distort, which can reduce filtering efficiency.

Separately, the filter art has made attempts to provide filters that rely more on plastics in an effort to minimize the material costs, parts and assembly steps. These plastic filters, however, do not appear to have proved commercially successful. For example, some attempts related to plastic automotive oil filters have suffered because the plastics chosen have not been able to withstand the significant temperature and pressure associated with oil filters. These filters also may not decrease the manufacturing steps or raw material costs, and they may not be particularly well-suited for recycling.

U.S. Pat. No. 5,171,430, relates to a filter assembly for fluids in which the filter has a unitary shell including an injection molded threaded end and an integral blow molded closed end, a replaceable filter element, a metal upper end cap which is received by the upper end of the shell, and a threaded end plate. While this patent indicates a goal of cost effectiveness, the fact that separate injection molding and blow molding steps must be performed thwarts this goal, because such multiple molding steps would be relatively expensive.

Although the prior art described above eliminates some of the problems inherent in the filter art, the prior art above still does not teach a plastic fluid filter and related method of assembly capable of the most cost-efficient production, the most reliable operation, the most environmentally friendly filter, or the most time-efficient automated assembly.

SUMMARY OF THE INVENTION

Accordingly, it is a purpose of the present invention to provide a fluid filter that is easier and more cost-effective to manufacture.

It is another purpose of the present invention to provide a fluid filter whose non-filtration components can be manufactured out of plastic less expensively than their conventional metal counterparts.

It is another purpose of the present invention to provide a fluid filter whose components do not require any machining or cutting, but instead are injection molded out of a plastic resin.

It is another purpose of the present invention to provide a fuel water separator that can be easily replaced on a conventional threaded mount.

It is another purpose of the present invention to provide a fluid filter that is made of plastic, except the paper filter media.

It is another purpose of the present invention to provide a plastic fluid filter that is capable of efficiently removing water from fuel.

It is another purpose of the present invention to provide a fluid filter that is less expensively manufactured by combining the end plate and gasket retainer into one molded piece, eliminating the grommet between the filter element upper end cap and the end plate, incorporating a mechanical, removable connection between the end plate and the upper end cap, and otherwise spacing the filter element from the housing.

It is another purpose of the present invention to provide a fluid filter that is less expensively manufactured by combining the end plate and gasket retainer into one molded piece, eliminating the grommet between the upper end cap and the end plate, and incorporating an interference fit or spin weld connection between the end plate and the housing.

It is another purpose of the present invention to provide an upper filter media end cap that mechanically, removably connects to an end plate.

It is another purpose of the present invention to provide an upper media end cap that screw connects to an end plate.

It is another purpose of the present invention to provide an upper media end cap that interference fit connect, via an annular hook-like projection, to an end plate.

It is another purpose of the present invention to provide a molded gasket retainer that can be used with different-sized gaskets.

It is another purpose of the present invention to provide a fluid filter that is more environmentally friendly.

It is another purpose of the present invention to provide a plastic fuel water separator that does not need a separate bowl to be attached thereto.

It is another purpose of the present invention to provide a plastic fuel water separator whose plastic components can be recycled after use, whose media element can be easily removed when the housing is opened, and whose paper filter media can be burned to create energy for the manufacturing or recycling of like filters.

It is another purpose of the present invention to provide a method for producing the above-described fluid filter that is more cost, labor and time efficient.

It is another purpose of the present invention to provide a method for producing a plastic fluid filter in fewer steps than conventional methods.

It is another purpose of the present invention to provide a method for producing a fluid filter that can be made without the need to seam or thread an end cap to a housing.

It is another purpose of the present invention to provide a method of filter production allowing easier, more reliable installation of a media element, and removal of the media element, when desired, such as when the housing is cut open for recycling.

It is still another purpose of the present invention to provide a fluid filter and methods for manufacturing same which are relatively simple and have a minimal number of components and steps, respectively, thereby ensuring low-cost, automated, mass production.

Finally, it is a purpose of the present invention to provide a plastic fuel water separator and related method of assembly that are more cost effective and environmentally friendly than the fuel water separators known in the art.

To achieve the foregoing and other purposes of the present invention there is provided a recyclable, spin on, integral filter including a filter housing having first and second open ends, said housing being injection molded as one piece from plastic. The first end of the housing is threaded to receive a separate water collection bowl. The second end of the housing includes an external annular recess that receives, by an interference fit or spin weld connection, a one piece plastic molded end plate member. The end plate member also includes on an exterior surface integrally therewith at least one gasket retainer. Upper and lower end caps are also each molded as one piece from plastic to receive the respective ends of the filter media therebetween and form a media element. One surface of the upper end cap also includes an annular projection that has a thread or protuberance for mechanical, removable connection of the media element with the end plate member. A hollow plastic molded center tube, is located inside a paper media that is cut, cured and clipped into a cylinder.

The method of manufacture of the filter includes the steps of: forming a cylindrical paper filter media element to include an end cap; removably screwing or interference fitting, respectively, the end cap to the underside of an end plate member; locating the end plate member on the second end of the housing, and fitting the rib and the recess together to create an interference fit, or spin welding, respectively, to connect the end plate to the housing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a side, cross-sectional view of a plastic filter housing according to a first embodiment of the present invention.

FIG. 2 is a partial enlarged view of the housing shown in FIG. 1, illustrating particularly the threaded first end of the housing intended to receive a separate threaded bowl.

FIG. 3 is a partial enlarged view of the housing shown in FIG. 1, illustrating particularly an opposite second end of the housing including a recess formed thereon.

FIG. 4 is a side, cross-sectional view of an end plate member according to the first embodiment of the present invention.

FIG. 5 is a partial enlarged view of one portion of the end plate member shown in FIG. 4, illustrating particularly a rib formed on a circumferential, annular flange.

FIG. 6 is a partial enlarged view of the end plate member shown in FIG. 4, illustrating particularly a threaded projection formed thereon.

DESCRIPTION OF THE PREFERRED EMBODIMENTS

The preferred embodiments of the present invention will now be described in detail with reference to FIGS. 1–20 herein.

Figure 12:
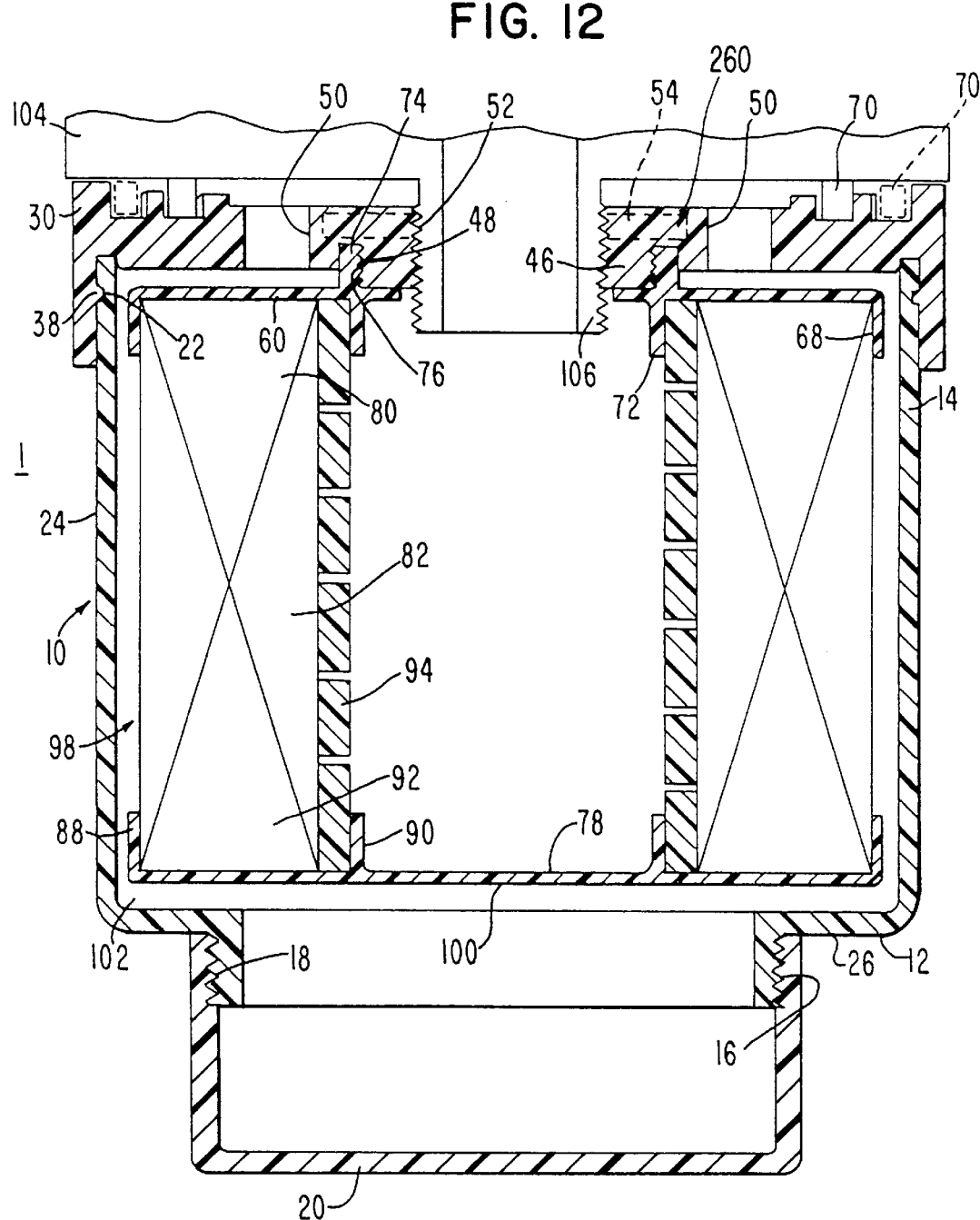
FIG. 12 is a side, cross-sectional view of the assembled filter according to an embodiment of the present invention.

FIGS. 1 and 12 illustrate an embodiment of the filter according to the present invention. The filter 1 includes a housing 10, which is shown in FIG. 1 as generally cylindrical and having a first open end 12 and a second open end 14. This housing 10 is preferably injection molded as one piece from plastic. Preferably, the plastic is clear Capron™ 8202, Zytel™ 330, Nylon™ 6, Minion™, Zytel™, Rynite™, or another Nylon™ derivative available from e.g. General Electric or DuPont. Paintable or colored versions of these plastics could also be used.

As best shown in FIGS. 1 and 2, the first end 12 of the housing 10 includes a thread 16. This thread 16 cooperates with a thread 18 formed on a separate bowl 20 shown in FIG. 12. More particularly, either before or after the filter 1 of the present invention is assembled on a mount, a bowl 20 is screwed thereon to close the first end 12 of the housing 10.

As best shown in FIG. 3, the second end 14 of the housing 10 of this embodiment preferably includes an external annular recess 22 that receives co-planar by an interference fit an annular rib 38 formed on a combination end plate/gasket retainer member 30 described below.

While certain dimensions are described below, they are suggested only by way of illustration and are not intended to limit the scope of the claims. As known in the art, fluid filters are produced in many varying sizes depending upon the application.

The inner diameter of the exemplary housing 10 shown in FIG. 1 is about 4.070 in., whereas the outer diameter is about 4.250 in. The inner diameter of an opening 28 in the external threaded portion 16 is about 2.640 in. The overall length of the housing 10 is about 3.803 in., whereas the length of the external threaded portion 16 is about 0.370 in. The thickness of the plastic along sides 24 of the housing 10 is about 0.090 in., whereas the thickness of the plastic along a base 26 of the housing 10 is about 0.120 in. The radius of the interface of the sides 24 and the base 26 is about 0.170.

The depth of the recess 22, relative to the thickness of the side 24, is about 0.030, and the distance the rib 38 projects from the end plate is slightly less than this dimension.

FIG. 4 illustrates a combination end plate/gasket retainer member 30 according to one embodiment of the present invention, hereinafter referred to as the end plate member. The end plate member 30 is generally planar and has a first end or surface 32 and a second opposite end or surface 34. The end plate member 30 is preferably made of Nylon™ 6 or the other plastics noted above used to make the housing.

As best seen in FIG. 5, the end plate member 30 includes a downwardly extending circumferential annular flange 36 upon which is formed interiorally the annular rib 38 that cooperates with the annular recess 22 shown in FIG. 3 and described above. Above the annular rib 38, at an inner interface of a generally planar area 40 of the end plate member 30 and the flange 36, there is located a well 42 to receive excess adhesive 44 used inbetween the end plate member 30 and the second end 14 of the housing 10, when the filter 1 is assembled as described below. The adhesive is available from the Loctite, Permabond or General Electric companies.

As shown in FIGS. 3 and 5, the edges of the housing second end 14 and the end plate member 30 are radiused or tempered. This facilitates connection of the end plate member 30 on the housing 10 as described below.

As best shown in FIG. 6, the first end 32 of the end plate member 30 also includes radially inward of the flange 36 an annular projection 46 having an external thread 48. This thread 48 cooperates with a thread 76 formed on an upper end cap 60 to be described below.

Figure 7:
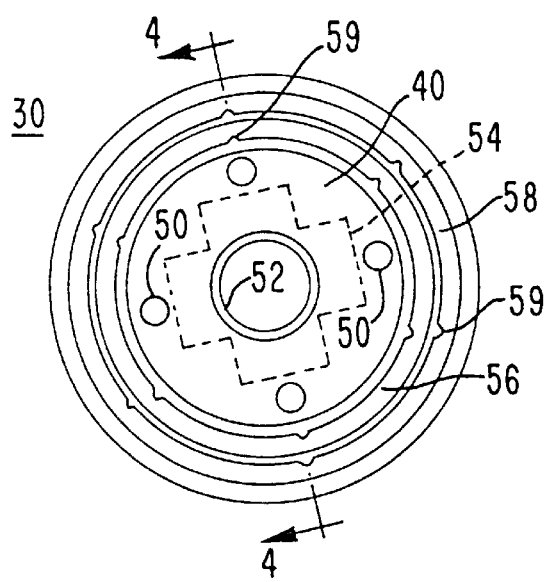
FIG. 7. is a top view of the end plate member shown in FIG. 4.

FIG. 7 is a top view of the second end 34 of the end plate member 30. As can be seen in FIGS. 4 and 7, the end plate member 30 includes therethrough equally radially spaced fluid inlet members 50, in this embodiment four. The end plate member 30 also has a central threaded aperture 52.

In this embodiment, the threaded aperture 52 is molded directly into the plastic of the end plate member 30. Alternatively, a metal insert 54 can be separately formed and threaded, and the end plate member 30 can be insert molded therearound, a procedure known in the molding art. The metal insert 54 can be one of many shapes, such as cross, rectangular, square, circular, etc.

The second end 34 of the end plate member 30 also includes a plurality of gasket retainer grooves formed concentrically thereon, two 56, 58 in the embodiment illustrated. Each groove 56, 58 includes equally radially spaced molded protuberances 59 that serve to position a gasket 70 (FIG. 12) and prevent same from rotating or otherwise becoming dislodged from the groove 56, 58. In regard to the gasket, a room temperature vulcanized gasket can be used.

The innermost groove 56 is intended to receive a gasket of a particular diameter for a particular application, whereas the outermost groove 58 is intended to receive a different, larger diameter gasket for another application. In this way, a single end plate member 30 can be formed that can fit housings having the same diameter, but having different capacities (lengths) and/or receiving different gaskets that different applications dictate.

As can be seen, the present invention eliminates the conventional separate thick metal end plate described above that had to be welded to one of at least two separate gasket retainers. Instead, the present invention uses a single end plate member with a gasket retainer molded integrally thereof for different gasket applications, and eliminates the assembly steps related to producing an end plate with one of at least two separate gasket retainers and attaching the chosen retainer by welding. Also, in comparison with the prior art, the edge of the gasket retainer is not used at all in attaching the end plate to the housing end, unlike the crimping of the retainer edge to connect the conventional end plate and housing end.

Figure 8:
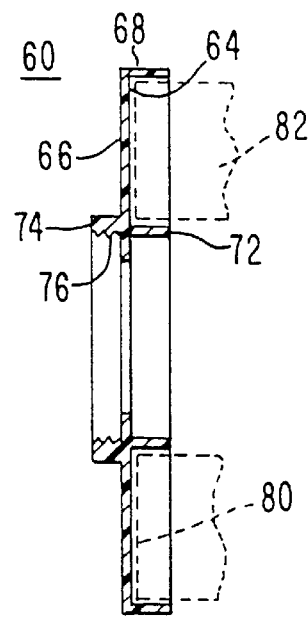
FIG. 8 is a side, cross-sectional view of an upper end cap according to an embodiment of the present invention.

FIG. 8 illustrates an upper end cap 60 that preferably is also molded as one piece from a cheaper plastic than that used for the housing, or can be made of, e.g., 6/6 glass filled Nylon™ 13%. The upper end cap 60 has a first end or surface 64 and a second end or surface 66. The first end 64 includes a circumferential annular flange 68 and an inward annular flange 72. These flanges 68, 72 serve to support an upper end 80 of a filter media 82 therein. The media 82 is conventional and is available from the Ahistrom, Hollingsworth & Vose and Custom Papers companies.

Figure 9:
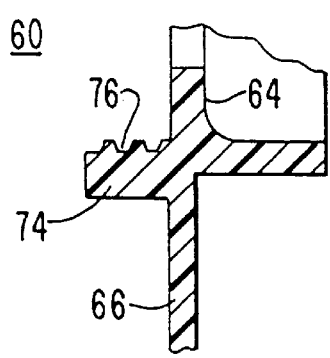
FIG. 9 is a partial enlarged view of the end cap shown in FIG. 8, illustrating particularly a threaded annular projection.

As best shown in FIGS. 8 and 9, on the second end 66 of the upper end cap 60 there is formed an annular projection 74 that includes an internal thread 76. This internal thread 76 cooperates with the external thread 48 on the projection 46 on the first end 32 of the end plate member 30, as discussed below. Of course, the respective positions of the threads could be reversed, if desired.

Figure 10:
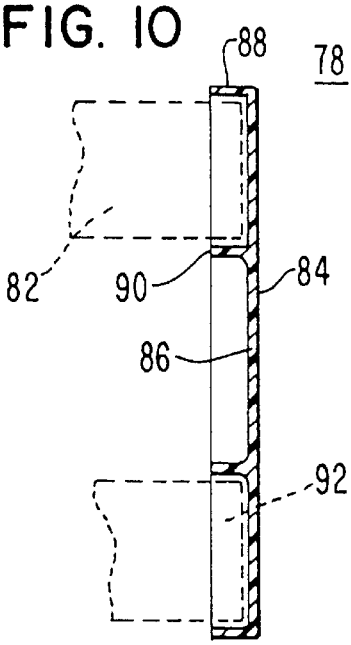
FIG. 10 is a side, cross-sectional view of a lower end cap according to the an embodiment of the present invention.

FIG. 10 illustrates a lower end cap 78 that preferably is also molded as one piece from plastic like the upper end cap 60. The lower end cap 78 has a first end or surface 84 and a second end 86. The first end 84 is planar. The second end 86 includes a circumferential annular flange 88 and an inward annular flange 90. These flanges 88, 90 serve to support a lower end 92 of the filter media 82 therein, as discussed below.

The upper and lower end caps 60, 78 have a wall thickness generally of about 0.60 in.

Figure 11:
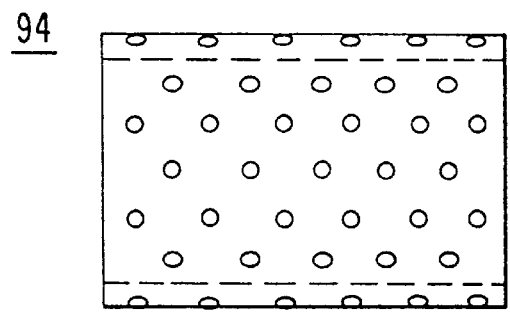
FIG. 11 is a side view of a center tube according to an embodiment of the present invention.

FIG. 11 illustrates a hollow perforated center tube 94 for the media 82 according to the present invention. The tube 94 is preferably made of plastic such as polypropylene, and can be injection molded separately from the end caps 60, 78. The center tube 94 could also be made of fiber. Alternatively, it is possible to mold the center tube 94 with the upper or lower end cap 60, 78 as one piece, place the cylindrical media 82 on the center tube 94/end cap 60 (78) combination and then connect the media 82/center tube 94/end cap 60 (78) combination to the other, not yet connected end cap (60) 78. The assembled media 82, center tube 94 and end caps 60, 78 will be referred to hereinafter as the media element 98.

Figure 13:
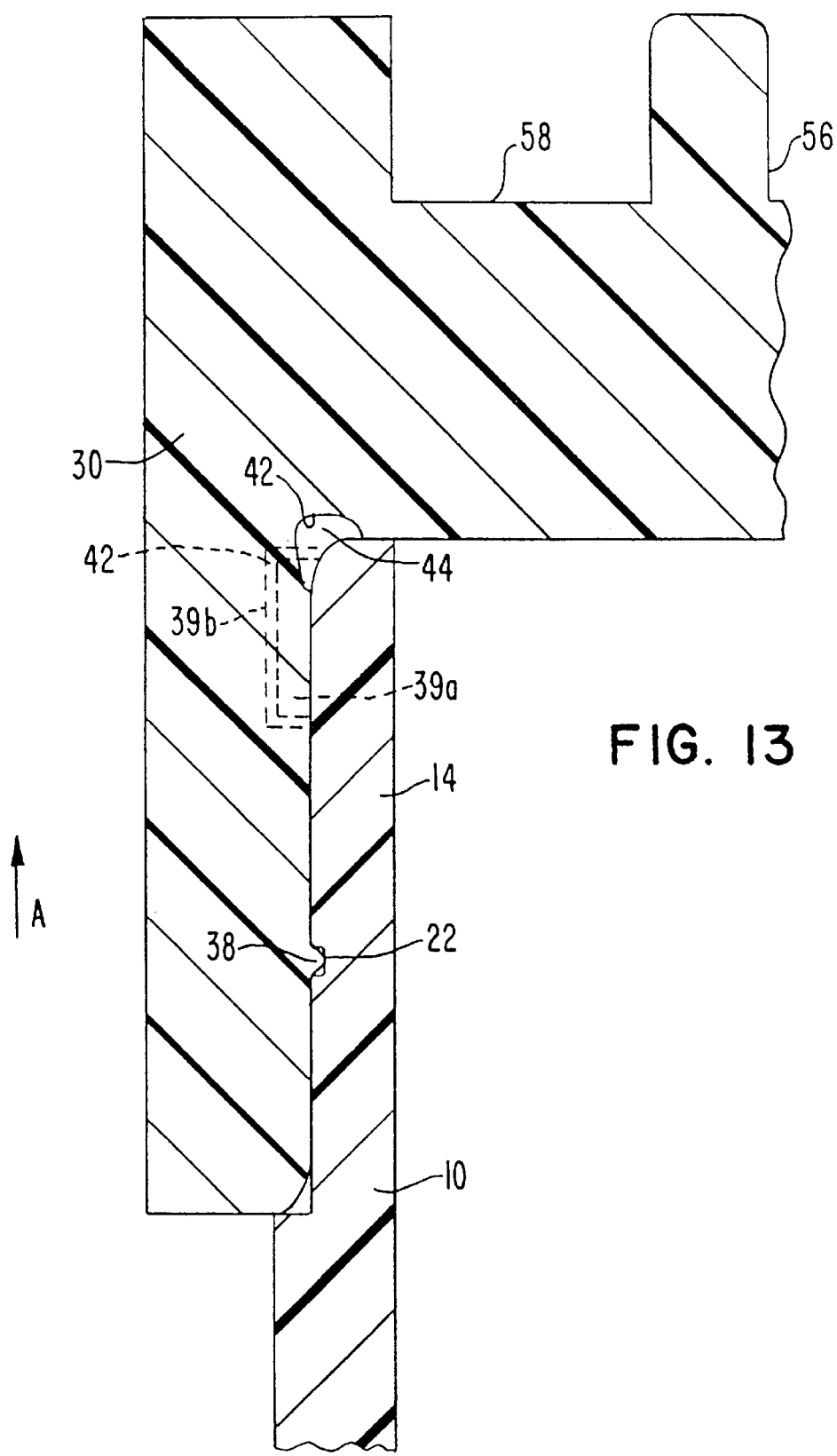
FIG. 13 is a partial enlarged view of the filter shown in FIG. 12, illustrating particularly the connection between the end plate member and the second end of the housing.

FIGS. 12 and 13 illustrate the assembly of the filter 1 according to an embodiment of the invention. As can be seen, the center tube 94 is located inside the paper filter media 82. Prior thereto, the media 82 is cut, cured and clipped into a cylinder as known in the art. The center tube 94 is connected between the upper and lower end caps 60, 78. In this embodiment, the upper end cap 60 is screw threaded into the end plate member 30 via the corresponding threads 76 and 48, respectively, to form a removable, mechanical connection 260. By removable it is meant that the connection is non-permanent and reversible, if desired. By mechanical it is meant a physical connection or cooperation other than conventional welding or adhering.

It is also possible to merely mold the end caps 60, 78 and center tube 94 directly onto the cylindrical media 82. It may also be desirable to mold the media 82 directly into the end plate member 30 and eliminate the upper end cap 60. Alternatively, it is possible to insert mold the end plate member 30 around an element 98 already including the upper and lower end caps 60, 78, media 82 and center tube 94.

As shown particularly in FIGS. 12 and 13, the first end 32 of the end plate member 30 is connected to the second end 14 of the housing 10. More particularly, in this embodiment some adhesive 44 may be applied at the rib 38, and the well 42 adjacent the rib 38 accepts excess adhesive and creates a seal. The end plate member 30 then receives the second end 14 of the housing 10 in the direction "A" shown in FIG. 13. Clearly, the end plate 30 could instead be pushed against the housing, if desired.

The inner diameter of the rib 38 is less than the outer diameter of the second end 14 of the housing 10. Accordingly, the rib 38 pushes inward against the outer diameter of the sides 24 of the second end 14 of the housing 10 as the end plate member 30 is being pushed onto the second end 14 of the housing 10. Ultimately, the rib 38 fits into the recess 22, which has an inner diameter less than the outer diameter of the second end 14 of the housing 10 and less than the inner diameter of the rib 38. Since the inner diameter of the rib 38 is greater than the outer diameter of the second end 14 of the housing 10, once the rib 38 is in the recess 22, the rib 38 will not come out of the recess 22 unless an unusual force is exerted on the end plate member 30 relative to the housing 10. Also, the rib 38 could be formed on the housing 10 and the recess 22 formed on the end plate member 30, if desired. Thus, in one embodiment, the present invention adopts an interference fit connector to connect the end plate member 30 and the housing 10. To further strengthen this connection, and to provide a better fluid seal, the adhesive 44 can be used between the end plate member 30 and the second end 14 of the housing 10.

An added benefit of the assembly of the filter 1 of the present invention over that described above relative to U.S. Pat. No. 4,740,299, is that at least a bottom 100 of the media element 98 is not supported upon nor does it even contact the base 26 of the housing 10. In the described prior art filter, the element sits directly on a plastic insert and the end plate member is forced down and seamed against the upper end of the housing, with the media element being squeezed between the end plate and the adaptor. Depending upon manufacturing tolerances, the media element could be compressed during end plate connection, causing the pleats thereof to push against each other which reduces filtering efficiency. In the present invention, there is a space 102 between the base 26 of the housing 10 and the media element 98, thereby preventing any compression of the element 98. Also, the media element 98, in this embodiment is continuously spaced from the housing 10.

The filter 1 is now ready to be attached to a mount 104. In this regard, the filter 1 is screwed onto the threaded stud 106 on the mount 104 (FIG. 12). Finally, a bowl 20 is attached to the first end 12 of the housing 10 to close the housing 10 and render same fluid tight.

In comparison to the filter described in U.S. Pat. No. 4,740,299, the present invention eliminates the metal housing, separately molded adaptor ring and the expensive structural adhesive for attaching the ring to the housing: all of these components are replaced by a single one-piece plastic housing.

Figure 14:
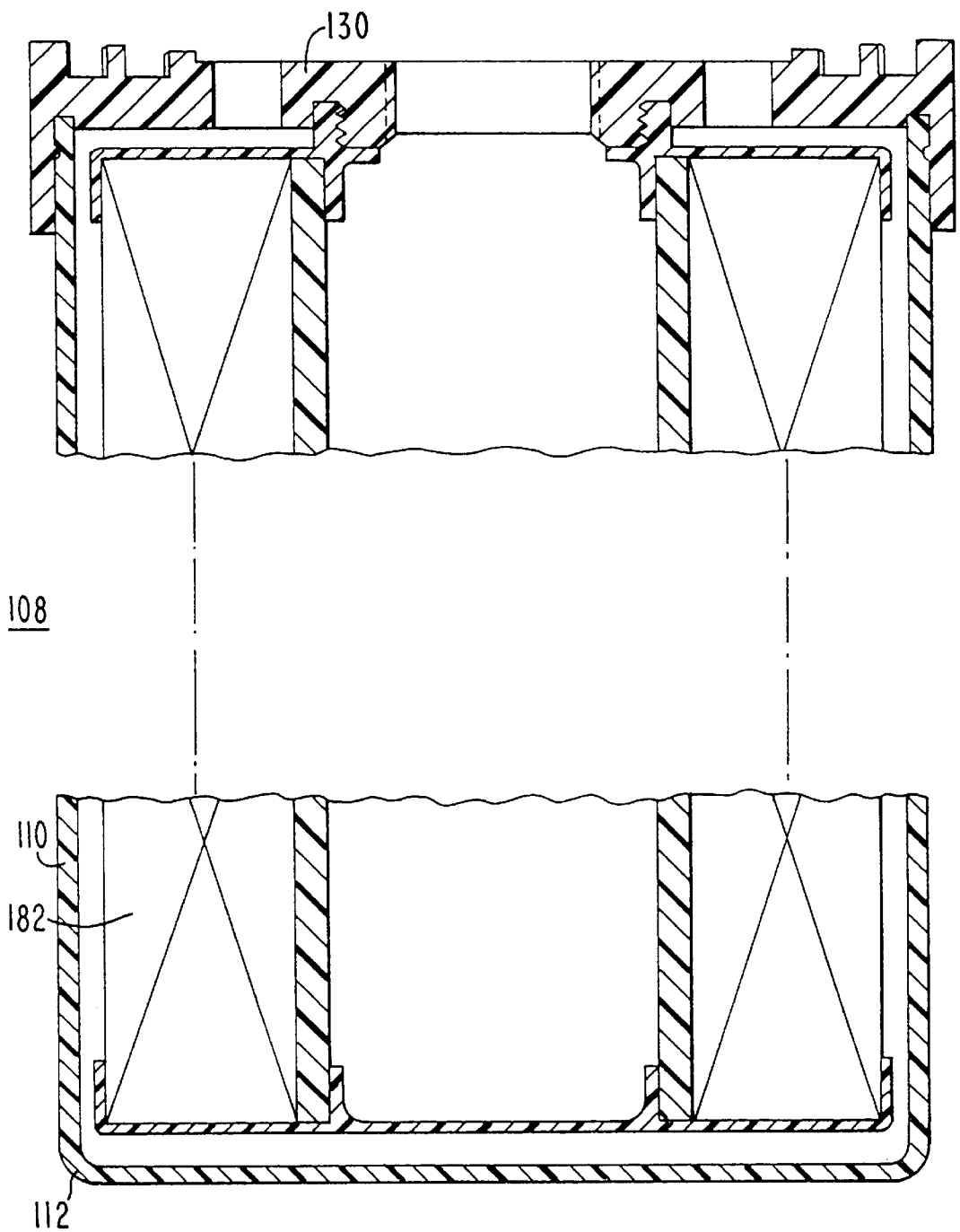
FIG. 14 is a side, cross-sectional view of an assembled filter according to an alternate embodiment of the present invention.

One of the objects of the present invention is to reduce the components of a conventional fuel water separator. In this regard, it is possible to eliminate the bowl 20 altogether. More particularly, a filter 108 can include a housing 110 having a closed first end 112 as shown in FIG. 14. All other components of the filter 108 according to the above-described embodiment of the present invention would be the same, such as end plate 130, except that the media 182 would be replaced with a conventional water absorbing media instead of a conventional water stripping media. Such water absorbing media 182 is available from the Alstrom Co. located in Chattanooga, Tenn. Further, in order to ensure enough capacity for removing generally the same amount of water as conventional fuel/water separators with bowls, the housing 110 according to this alternative embodiment may be longer. When the filter 108 has reached its capacity, the filter 108 is removed and merely replaced with a new, similar filter. There is no need to handle a bowl as with a conventional filter, or even with the embodiment described above that uses a removable bowl 20.

An alternate embodiment of the present invention, relating particularly to the upper end cap structure, and how the end plate is connected to the housing, will now be described with relation to FIGS. 15–18.

Figure 15:
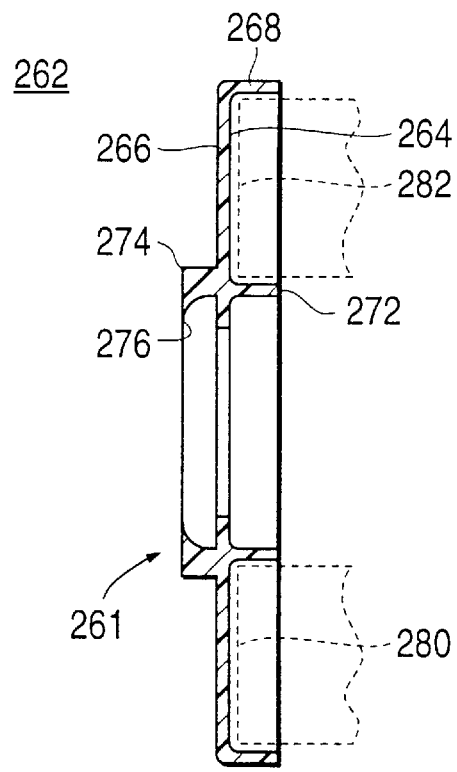
FIG. 15 is a side, cross-sectional view of an upper end cap according to an alternate embodiment of the present invention.

FIG. 15 illustrates an upper end cap 262 that preferably is also molded as one piece from plastic such as 6/6 glass filled Nylon™ 13%. The upper end cap 262 has a first end or surface 264 and a second end or surface 266. The first end 264 includes a circumferential annular flange 268 and an inward annular flange 272. These flanges 268, 272 serve to support an upper end 280 of a filter media 282 therein.

Figure 16:
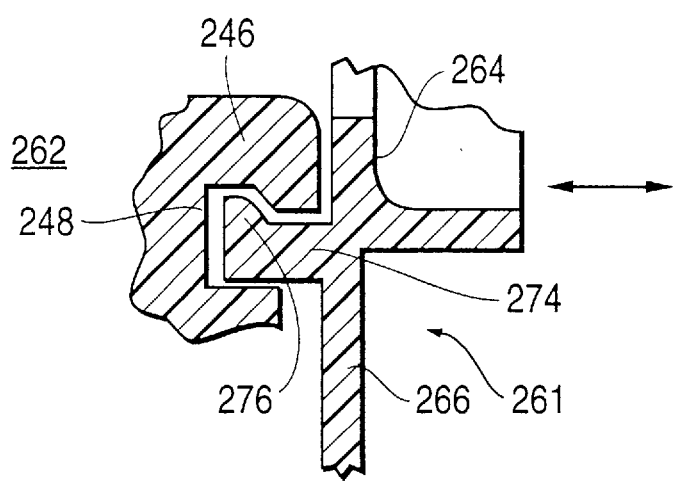
FIG. 16 is a partial enlarged view of the end cap shown in FIG. 17, illustrating particularly the protuberance for connection to the end plate.

As best shown in FIGS. 15 and 16, on the second end 266 of the upper end cap 262 there is formed, as part of a removable, mechanical connection 261, an annular projection 274 that includes a protuberance 276 in the form of an annular hook-like member. This protuberance 276 cooperates with a corresponding annular recess 248 formed in a projection 246 on a first end 232 of an end plate member 230, as discussed below in relation particularly to FIGS. 16 and 17. Of course, the protuberance 276 can be formed on the end plate member 230, and the recess 248 could be formed on the end cap 262.

Figure 17:
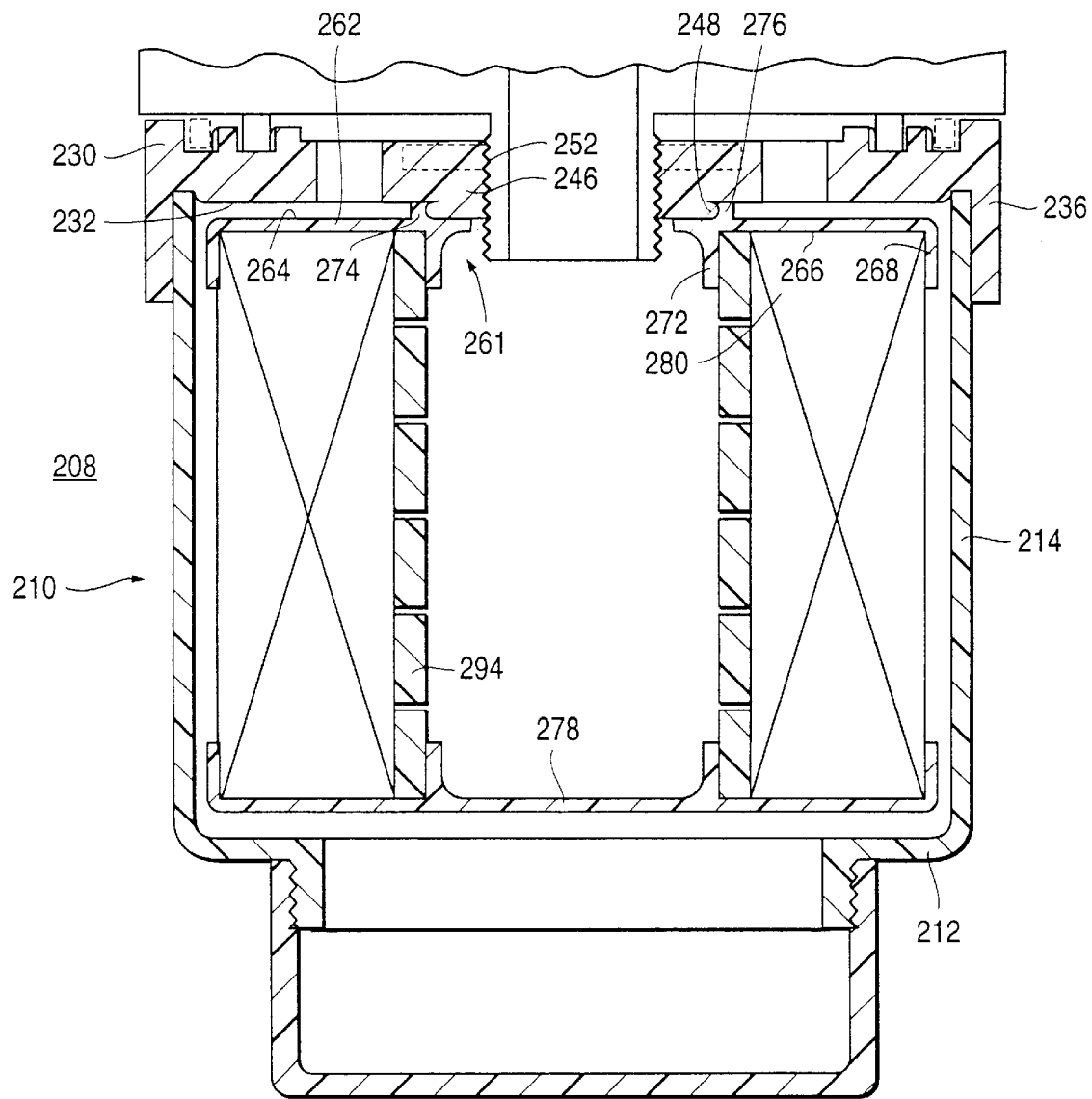
FIG. 17 is a side, cross-sectional view of the assembled filter according to an alternate embodiment of the present invention.

FIG. 17 illustrates the assembly of a filter 208 according to this embodiment of the invention. As can be seen, a center tube 294 is located inside paper filter media 282. The center tube 294 is connected between the upper and lower end caps 262, 278. It is also possible to merely mold the end caps 262, 278 and center tube 294 directly onto the cylindrical media 82.

The upper end cap 262 is removably, mechanically, interference removably fit onto the end plate member 230 via the removable mechanical connection 261, i.e. the corresponding protuberance 276 and recess 248, respectively (see, e.g., FIG. 16). With the upper end cap 262 being made of plastic, the protuberance 276 has the ability to expand to some extent over the annular projection 246 of the end plate 230 when being assembled, and has the typical plastic characteristic of shape memory so that, upon encountering the recess 248, the protuberance 276 interference fits into the recess 248. Also, as discussed below, this connection is removable by reversing this assembly, i.e., pulling the protuberance 276 out of the recess 248.

The end plate 230 can then be attached to the housing 210 via the rib/recess combination discussed above, or by a different type of connection as described below in relation to FIG. 18.

Figure 18:
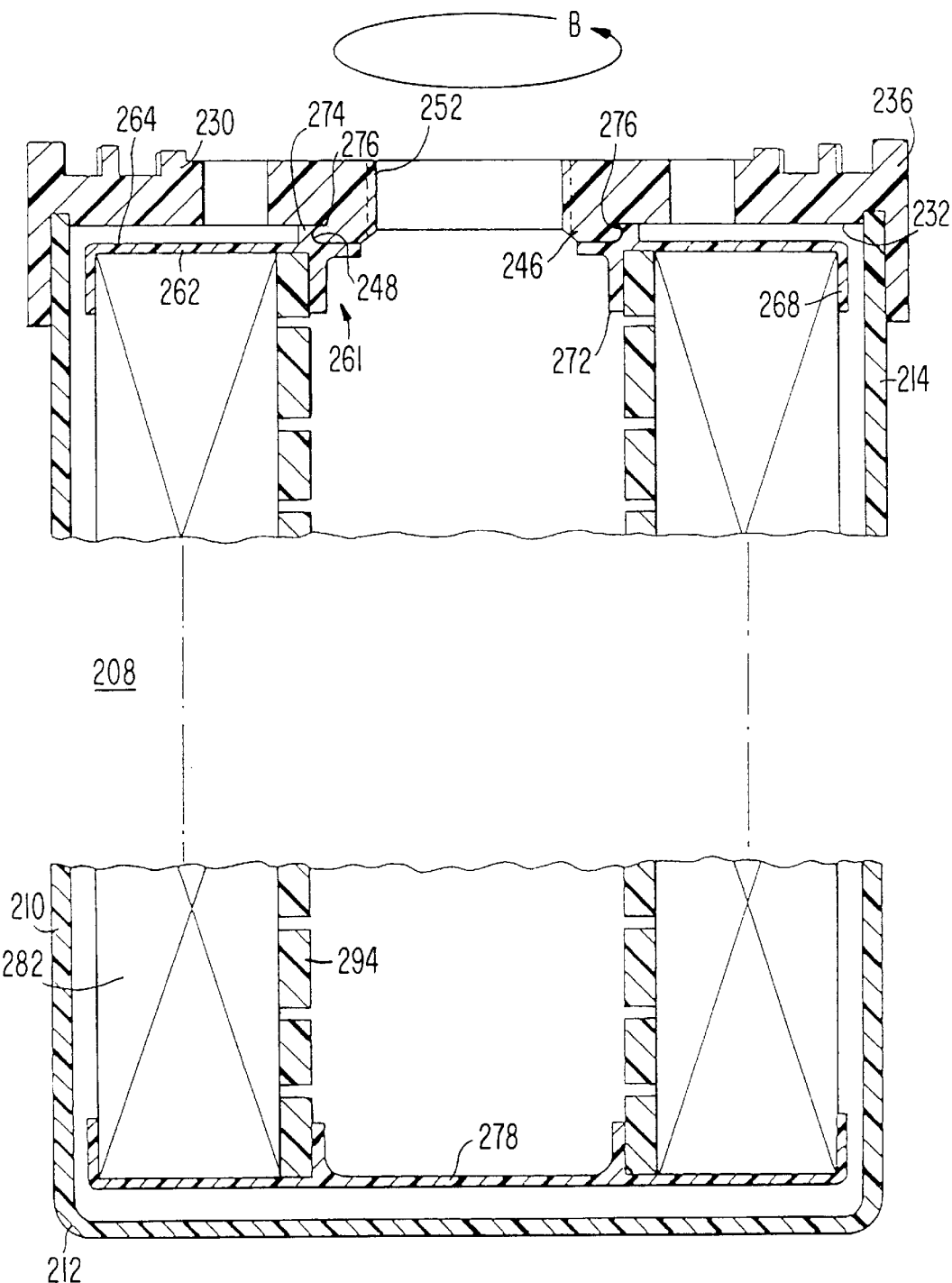
FIG. 18 is a side, cross-sectional view of the assembled filter according to an alternate embodiment of the present invention.

As shown in FIG. 18, the first end 232 of the end plate member 230 can be spin welded to the second end 214 of the housing 210. This type of connection is known in the art, as evidenced by French Publication No. 2,082,912, and U.S. Pat. No. 5,238,717.

More particularly, an outer circumferential flange 236 on the end plate 230 receives the second open end 214 of the housing, the respective surfaces of which are relatively smooth. Then, the end plate 230 is spun at high speeds in, e.g., the direction shown by arrow "B" to create friction, soften the interfacing plastic surfaces and meld these members together. Once cooled, this interface permanently holds the end plate 230 on the housing 210 and forms a seal therebetween. Then, the filter 201 is spun onto a mount via a threaded aperture 252 just like a conventional filter.

Further, the removable, mechanical connection, 261 of the end cap on the end plate described above, can also be used to great benefit with a conventional metal housing and end plate, if desired. That is, a metal end plate is formed to include the thread or recess shown in FIGS. 12 and 17, respectively, and the corresponding plastic end cap described herein is mechanically, removably connected thereto. The end plate can then be attached conventionally by crimping a conventional gasket retainer on the housing edge.

Figure 19:
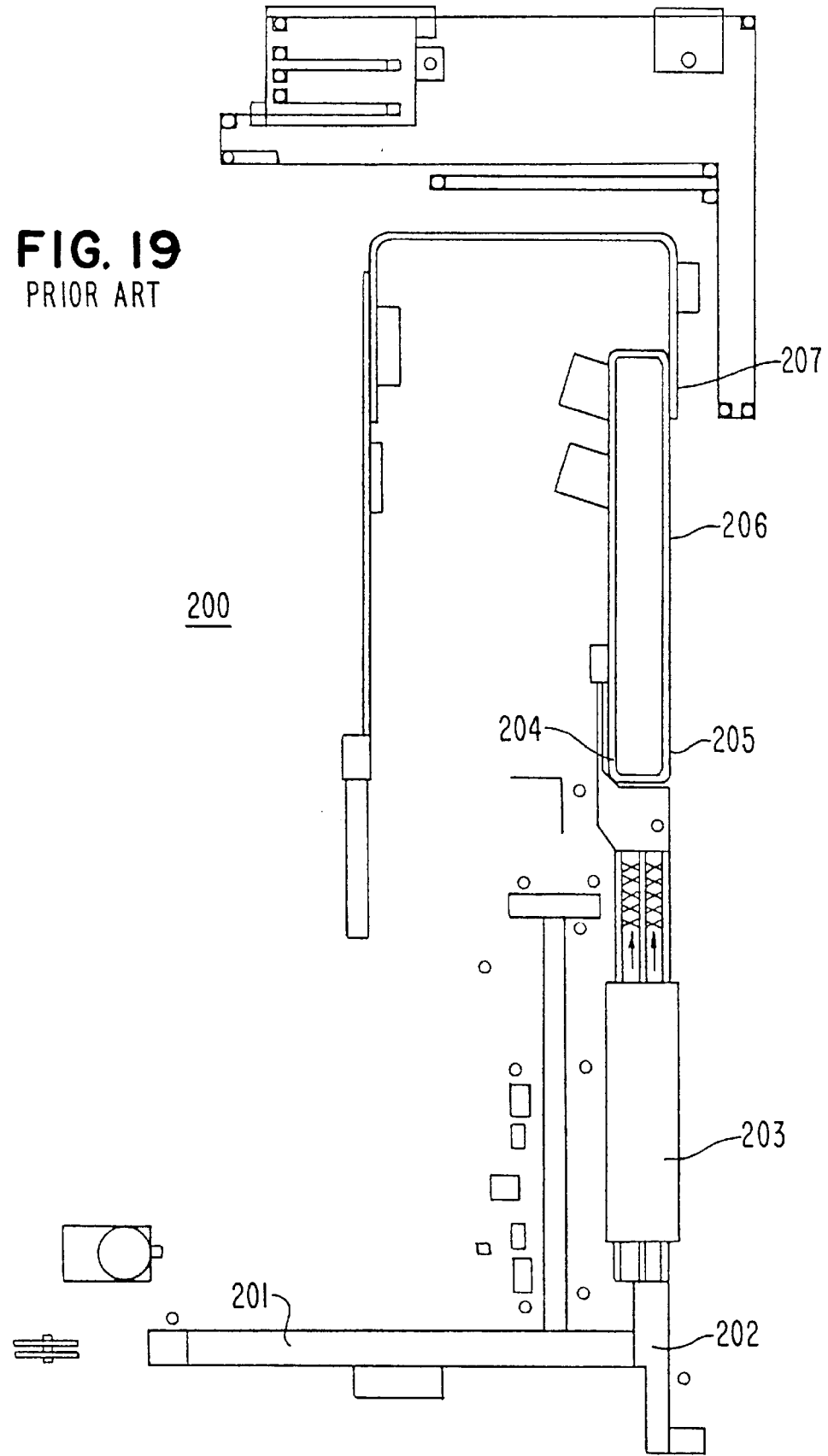
FIG. 19 is a schematic view of a method for producing a filter according to the prior art.

FIG. 19 illustrates a conventional assembly line 200 for producing a fuel water separator such as described in U.S. Pat. No. 4,740,299. In this line 200 the first station 201 is the unrolling, cutting, pleating, infrared curing and clipping of the paper filter media, all steps well known in the art. The second station 202 relates to the insertion of a metal center tube into the cylindrical media formed at station 201, and application of the metal upper and lower end caps to the media and center tube combination to form a media element. The end caps are attached using Plastisol. The media element then goes through a final cure at a third station 203. At a fourth station 204, a grommet is placed on top of the media element. At a fifth station 205, adhesive must be added to the separate plastic adaptor and the adaptor is positioned in the base of the housing, which has been separately formed by metal drawing techniques known in the art. It must be remembered that the interface of the adaptor and the lower end of the housing must act as a seal via the adhesive, without any further mechanical seal, so it must be carefully formed. This step 205 is particularly labor intensive since it is non-automated. The effective cost of this step is also relatively high since the adhesive is very expensive as noted above. At a sixth station 206, the media element is loaded in the housing against the plastic adaptor. The metal end plate, which has already been centrally threaded and to which a metal gasket retainer has already been applied, is then seamed to the housing open upper end at a seventh station 207. The filter is then painted, dried, spot leak tested for quality and packed for shipment, at subsequent stations.

Figure 20:
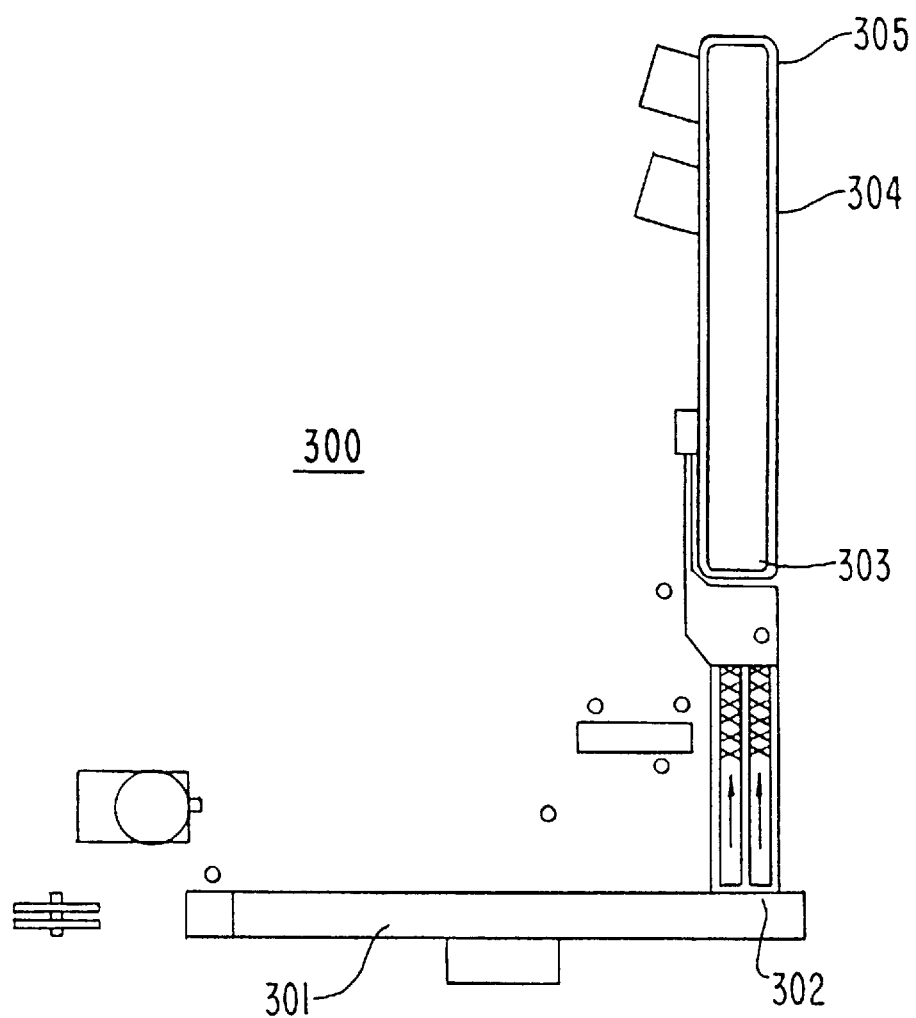
FIG. 20 is a schematic view of a method for producing a filter according to the present invention.

With the methods according to the present invention, many of the above-described steps are eliminated. Reference is made to FIG. 20. In this line 300 the first station 301 is the unrolling, cutting, pleating, curing and clipping of the paper filter media, as discussed above. The second station 302, however, relates to the insertion of the plastic center tube into the cylindrical media and connection of the plastic upper and lower end caps to the media and center tube combination via, e.g. ultrasonic welding, to form a media element. There is no need for the messy Plastisol of the prior art method and the media element therefore does not need to go through a second cure. At a third station 303, the upper end cap is connected to the underside of the end plate member by the corresponding threads or protuberance/recess combination, discussed above, either of which could be on the end cap or the end plate. No grommet needs to be placed into the upper end cap as was required with the prior art. No separate adaptor needs to be formed, no structural adhesive needs to be added to an adaptor, and no adaptor needs to be manually positioned in the lower open end of the housing, because the threaded lower end of the housing is integral with the housing. This avoids altogether the steps in the prior art that are particularly labor and cost intensive.

At a fourth station 304, the media element is loaded in the housing. The end plate member, which is molded to include the gasket retainer, inlet holes and central threaded aperture, receives the second end of the housing, and connection is made either by the rib/recess combination or spin welding, as described above. It is preferable to have the end plate member/cured element combination moving on a conveyor belt upside down, i.e., with the media on top. This facilitates automated assembly since the housing can merely be dropped down onto the end plate member/element combination. The filter is then painted, dried, tested and packed, at subsequent stations.

Overall, the methods according to the present invention eliminate the prior art's third, fourth, fifth and sixth stations in their entireties, and makes the second and seventh stations far simpler, cost effective and more amenable to automation. The capital and operational costs of at least the second curer and seamer are eliminated. Also, the number of people required to run the line can be reduced to about one-third.

In addition to the above-described benefits, the present filter invention is more environmentally friendly by being easier to recycle. The filter, after being used in the ordinary fashion to remove a quantity of water from a fuel line system, is removed and replaced with a new filter. The used filter can be returned to a processing facility: the filter is cut open, the media element removed by un-threading or disengaging the end cap hook from the end plate recess, and the plastic components are re-ground for reuse in producing further filters. The paper media, which still contains some fuel, can be incinerated. The energy generated from the burning of the media can be harnessed according to conventional methods and used as energy to produce further filters or in the recycling efforts.

The embodiment described above which includes a metal insert molded into the end plate member is less conducive to this type of recycling since the insert must be removed from the plastic before the plastic can be re-used.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to that fall within the scope of the invention and the appended claims.

What is claimed is:

1. A throwaway, integral fluid filter for engagement with a threaded filter mount, comprising:
   a housing having a first end and a second open end;
   a separate, substantially planar end plate member connected to the second, open-end of the housing via an annular projection and receptacle combination formed on the second end of the housing and the end plate member;
   wherein the end plate includes a central threaded portion for engagement with the threaded filter mount;
   a media element connected to the end plate member by an end cap; and
   a removable, mechanical connection between the end cap and the end plate.

2. The filter as recited in claim 1, wherein the removable, mechanical connection comprises the upper end cap being threaded for engagement with the end plate member via a second threaded portion on the end plate member.

3. The filter as recited in claim 1, wherein the removable, mechanical connection includes a protuberance formed on one of the end cap and the end plate member, and a recess formed on the other of the end cap and end plate member, and
   wherein the protuberance is received by the recess via an interference fit.

4. The filter as recited in claim 1, wherein the end plate member further includes integrally therewith a plurality of gasket grooves.

5. The filter as recited in claim 1, wherein the element is continuously spaced from the housing.

6. A filter comprising:
   a housing having a first end and a second open end;
   a substantially planar end plate member connected to the second, open-end of the housing;
   a media element connected to the end plate member by an end cap; and
   a removable, mechanical connection between the end cap and the end plate,
   wherein one of the second end of the housing and end plate member includes an annular recess and the other of the second end of the housing and the end plate member includes an annular rib, and
   wherein the end plate member is connected to the housing via the rib being received by the recess.

7. A throwaway, integral fluid filter for engagement with a threaded filter mount, comprising:
   a filter housing having a first end and a second open end;
   a separate, substantially planar end plate member having a first end and a second end;
   wherein the end plate includes a central threaded portion for engagement with the threaded filter mount;
   a filter element including media, an upper end cap having a first end and a second end, the first end for receiving an end of the media; and
   a removable, mechanical connection formed on the end cap and the end plate member,
   wherein the second end of the upper end cap is removably, mechanically connected to the first end of the end plate member, and the first end of the end plate member is connected to the second end of the housing with a weld therebetween.

8. The filter as recited in claim 7, wherein the removable, mechanical connection comprises the upper end cap being threaded for engagement with the end plate member via a second threaded portion on the end plate.

9. The filter as recited in claim 7, wherein the first end of the housing is open and is threaded to receive a separate threaded bowl.

10. The filter as recited in claim 7, wherein the first end is a closed end.

11. The filter as recited in claim 7, wherein the end plate member includes a central threaded aperture.

12. The filter as recited in claim 7, wherein the second end of the end plale member further comprises a plurality of gasket retainer grooves formed concentrically thereon.

13. The filter as recited in claim 7, wherein the element is continuously spaced from the housing.

14. A filter comprising:
   a filter housing having a first end and a second open end;
   a substantially planar end plate member having a first end and a second end;
   a filter element including media, an upper end cap having a first end and a second end, the first end for receiving an end of the media; and
   a removable, mechanical connection formed on the end cap and the end plate member,
   wherein the second end of the upper end cap is removably, mechanically connected to the first end of the end plate member, and the first end of the end plate member is connected to the second end of the housing,
   wherein the removable, mechanical connection includes a protuberance formed on one of the end cap and the end plate member, and a recess formed on the other of the end cap and end plate member, and wherein the protuberance is received by the recess via an interference fit.

15. A filter comprising:

a filter housing having a first end and a second open end;

a substantially planar end plate member having a first end and a second end;

a filter element including media, an upper end cap having a first end and a second end, the first end for receiving an end cap the media; and a removable, mechanical connection formed on the end cap and the end plate member, wherein the second end of the upper end cap is removably, mechanically connected to the first end of the end plate member, and the first end of the end plate member is connected to the second end of the housing, wherein one of the second end of the housing and end plate member includes an annular recess and the other of the second end of the housing and the end plate member includes an annular rib, and wherein the end plate member is connected to the housing via the rib being received by the recess.

16. A filter, comprising:

a filter housing having a first end and a second open end;

a substantially planar end plate member having a first end and a second end;

a filter element including media, an upper end cap having a first end and a second end, the first end for receiving an end of the media; and a removable, mechanical connection formed on the end cap and the end plate member, wherein the second end of the upper end cap is removably, mechanically connected to the first end of the end plate member, and the first end of the end plate member is connected to the second end of the housing, wherein the second end of the end plate member further comprises a plurality of gasket retainer grooves formed concentrically thereon, and wherein an innermost one of the plurality of grooves receives a gasket of a first diameter, and an outermost one of the plurality of grooves receives a gasket of a second, larger diameter.

17. A fluid filter, comprising:

a cylindrical plastic housing having a first end and a second open end;

a separate, substantially planar plastic end plate member;

a connector formed on the housing and the end plate member;

a filter media element including a plastic end cap, a removable, mechanical connection formed on the end cap and the end plate member, wherein the end cap is removably, mechanically connected to the end plate member via the removable, mechanical connection, and the end plate member is non-movably connected to the second end of the housing via the connector.

18. The filter as recited in claim 17, wherein the connector includes a weld between the end plate and the housing.

19. The filter as recited in claim 17, wherein the first end of the housing is open and is threaded to receive a separate threaded bowl.

20. The filter as recited in claim 17, wherein the first end is a closed end.

21. The filter as recited in claim 17, wherein the element is continuously spaced from the housing.

22. A filter, comprising:

a cylindrical plastic housing having a first end and a second open end;

a substantially planar plastic end plate member;

a connector formed on the housing and the end plate member;

a filter media element including a plastic end cap, a removable, mechanical connection formed on the end cap and the end plate member, wherein the end cap is removably, mechanically connected to the end plate member via the removable, mechanical connection, and the end plate member is connected to the second end of the housing via the connector, and wherein the removable, mechanical connection comprises the upper end cap being threaded for engagement with the end plate member which is also threaded.

23. A filter, comprising:

a cylindrical plastic housing having a first end and a second open end;

a substantially planar plastic end plate member;

a connector formed on the housing and the end plate member, a filter media element including a plastic end cap, a removable, mechanical connection formed on the end cap and the end plate member, wherein the end cap is removably, mechanically connected to the end plate member via the removable, mechanical connection, and the end plate member is connected to the second end of the housing via the connector, and wherein the removable, mechanical connection includes a protuberance formed on one of the end cap and the end plate member, and a recess formed on the other of the end cap and end plate member, and wherein the protuberance is received by the recess via an interference fit.

24. A filter, comprising:

a cylindrical plastic housing having a first end and a second open end;

a substantially planar plastic end plate member;

a connector formed on the housing and the end plate member, a filter media element including a plastic end cap, a removable, mechanical connection formed on the end cap and the end plate member, wherein the end cap is removably, mechanically connected to the end plate member via the removable, mechanical connection, and the end plate member is connected to the second end of the housing via the connector, wherein the connector includes an annular recess formed in one of the second end of the housing and the end plate member, and an annular rib formed on the other of the second end of the housing and end plate member, and wherein the end plate member is attached to the housing via an interference fit of the rib being received by the recess.

25. The filter as recited in claim 24, wherein adhesive is located at the rib, and a well is formed adjacent the rib to receive excess adhesive.

26. A filter comprising:
a cylindrical plastic housing having a first end and a second open end;
a substantially planar plastic end plate member;
a connector formed on the housing and the end plate member,
a filter media element including a plastic end cap,
a removable, mechanical connection formed on the end cap and the end plate member,
wherein the end cap is removably, mechanically connected to the end plate member via the removable, mechanical connection, and the end plate member is connected to the second end of the housing via the connector, and
wherein the end plate member further includes integrally therewith a plurality of gasket grooves.

27. A filter comprising:
a cylindrical plastic housing having a first end and a second open end;
a substantially planar plastic end plate member;
a connector formed on the housing and the end plate member,
a filter media element including a plastic end cap,
a removable, mechanical connection formed on the end cap and the end plate member,
wherein the end cap is removably, mechanically connected to the end plate member via the removable, mechanical connection, and the end plate member is connected to the second end of the housing via the connector,
wherein the end plate member further includes integrally therewith a plurality of gasket grooves, and
wherein an innermost one of the plurality of grooves receives a gasket of a first diameter, and an outermost one of the plurality of grooves receives a gasket of a second, larger diameter.

28. A method for manufacturing a fluid filter, comprising the steps of:
forming a housing having a first end and a second, open end;
forming a filter element including media and an end cap for receiving an end of the media;
forming an end plate member;
forming a connection between the end plate member and the second end of the housing;
forming a removable, mechanical connection between the end plate member and the end cap;
removably, mechanically connecting the end cap to the end plate member via the connection; and
non-removably connecting the end plate member and the housing.

29. The method as recited in claim 28, wherein the step of forming the housing includes the step of forming the first end to be a closed end.

30. The method as recited in claim 28, wherein the step of forming the housing includes the step of forming the first end to be an open end that receives a separate threaded bowl.

31. A method for manufacturing a filter, comprising the steps of:
forming a housing having a first end and a second, open end;
forming a filter element including media and an end cap for receiving an end of the media;
forming an end plate member;
forming a connection between the end plate member and the second end of the housing;
forming a removable, mechanical connection between the end plate member and the end cap;
removably, mechanically connecting the end cap to the end plate member via the connection; and
connecting the end plate member and the housing,
wherein the step of removably, mechanically connecting comprises the sub-steps of:
forming the upper end cap and the end plate member with corresponding threads, and screwing the end cap and end plate member together.

32. A method for manufacturing a filter, comprising the steps of:
forming a housing having a first end and a second, open end;
forming a filter element including media and an end cap for receiving an end of the media;
forming an end plate member;
forming a connection between the end plate member and the second end of the housing;
forming a removable, mechanical connection between the end plate member and the end cap;
removably, mechanically connecting the end cap to the end plate member via the connection; and
connecting the end plate member and the housing,
wherein the step of removably, mechanically connecting comprises the sub-steps of:
forming a protuberance on one of the end cap and the end plate member, and a recess on the other of the end cap and end plate member, and interference fitting the protuberance in the recess.

33. A method, for manufacturing a filter, comprising the steps of:
forming a housing having a first end and a second, open end;
forming a filter element including media and an end cap for receiving an end of the media;
forming an end plate member;
forming a connection between the end plate member and the second end of the housing;
forming a removable, mechanical connection between the end plate member and the end cap;
removably, mechanically connecting the end cap to the end plate member via the connection; and
connecting the end plate member and the housing,
wherein the step of forming a connection between the end plate member and the second end of the housing comprises the sub-steps of:
forming, on one of the second end of the housing and end plate, an annular recess and, on the other of the second end of the housing and the end plate member, an annular rib, and connecting the end plate member to the housing via the rib being received by the recess.

34. A method for manufacturing a filter, comprising the steps of:
forming a housing having a first end and a second, open end;
forming a filter element including media and an end cap for receiving an end of the media;
forming an end plate member;

forming a connection between the end plate member and the second end of the housing;

forming a removable, mechanical connection between the end plate member and the end cap;

removably, mechanically connecting the end cap to the end plate member via the connection; and connecting the end plate member and the housing, wherein the step of forming a connection between the end plate member and the second end of the housing comprises the sub-step of:

spin welding together the second end of the housing and the end plate member.

35. A method for manufacturing a filter, comprising the steps of:

forming a housing having a first end and a second, open end;

forming a filter element including media and an end cap for receiving an end of the media:

forming an end plate member;

forming a connection between the end plate member and the second end of the housing;

forming a removable, mechanical connection between the end plate member and the end cap;

removably, mechanically connecting the end cap to the end plate member via the connection;

connecting the end plate member and the housing; and forming the end plate member to include a plurality of gasket grooves.

36. A method for manufacturing a fluid filter, comprising the steps of:

forming a filter element to include media and a plastic end cap;

forming a substantially planar plastic end plate member;

removably, mechanically connecting the end cap to the end plate member;

forming a plastic filter housing to include a first end and a second open end; and non-removably attaching the end plate member to the second open end of the filter housing.

37. The method as recited in claim 36, wherein the step of forming the housing includes the step of forming the first end to be a closed end.

38. The method as recited in claim 36, wherein the step of forming the housing includes the step of forming the first end to be an open end that receives a separate threaded bowl.

39. A method for manufacturing a fluid filter, comprising the steps of:

forming a filter element to include media and a plastic end cap;

forming a substantially planar plastic end plate member;

removably, mechanically connecting the end cap to the end plate member;

forming a plastic filter housing to include a first end and a second open end; and attaching the end plate member to the second open end of the filter housing, wherein the step of removably, mechanically connecting comprises the sub-steps of:

forming the end cap with threads;

forming the end plate member with threads; and screwing the upper end cap and the end plate member together via the threads.

40. A method for manufacturing a fluid filter, comprising the steps of:

forming a filter element to include media and a plastic end cap;

forming a substantially planar plastic end plate member;

removably, mechanically connecting the end cap to the end plate member;

forming a plastic filter housing to include a first end and a second open end; and attaching the end plate member to the second open end of the filter housing, wherein the step of removably, mechanically connecting comprises the sub-steps of:

forming a protuberance on one of the end cap and the end plate member, and a recess on the other of the end cap and the end plate member, and interference fitting the protuberance into the recess.

41. A method for manufacturing a fluid filter, comprising the steps of:

forming a filter element to include media and plastic end cap;

forming a substantially planar plastic end plate member;

removably, mechanically connecting the end cap to the end plate member;

forming a plastic filter housing to include a first end and a second open end; and attaching the end plate member to the second open end of the filter housing, wherein the step of attaching the end plate member to the second end of the housing includes the sub-steps of:

forming one of a rib and a recess on the second end of the housing, forming the other of the rib and recess on the end plate member, and inserting the rib into the recess to create an interference fit.

42. A method for manufacturing a fluid filter, comprising the steps of:

forming a filter element to include media and a plastic end cap;

forming a substantially planar plastic end plate member;

removably, mechanically connecting the end cap to the end plate member;

forming a plastic filter housing to include a first end and a second open end; and attaching the end plate member to the second open end of the filter housing, wherein the step of attaching the end plate member to the second end of the housing comprises the sub-step of:

spin welding together the second end of the housing and the end plate member.

43. A method for manufacturing a fluid filter, comprising the steps of:

forming a filter element to include media and a plastic end cap;

forming a substantially planar plastic end plate member;

removably, mechanically connecting the end cap to the end plate member;

forming a plastic filter housing to include a first end and a second open end; and attaching the end plate member to the second open end of the filter housing, wherein the step of forming the element further includes the steps of:

forming a hollow plastic center tube; inserting the center tube in the media; and attaching the center tube to the end cap.

44. A method for manufacturing a fluid filter, comprising the steps of:

forming a filter element to include media and a elastic end cap;

forming a substantially planar plastic end plate member;

removably, mechanically connecting the end cap to the end plate member;

forming a plastic filter housing to include a first end and a second open end; and attaching the end plate member to the second open end of the filter housing, wherein the step of forming the element further includes the steps of forming a hollow plastic center tube; inserting the center tube in the media; attaching the center tube to the end cap; forming a second end cap for the element; and attaching the second end cap to an opposite end of the plastic center tube.

45. A method for manufacturing a fluid filter, comprising the steps of:

forming a filter element to include media and a plastic end cap;

forming a substantially planar plastic end plate member;

removably, mechanically connecting the end cap to the end plate member;

forming a plastic filter housing to include a first end and a second open end; and attaching the end plate member to the second open end of the filter housing, wherein the step of forming the end plate member includes the step of forming a plurality of concentric gasket retainers on the end plate member.

46. A method for manufacturing a fluid filter, comprising the steps of:

forming a filter element to include media and a plastic end cap;

forming a substantially planar plastic end plate member;

removably, mechanically connecting the end cap to the end plate member;

forming a plastic filter housing to include a first end and a second open end; and attaching the end plate member to the second open end of the filter housing, wherein the step of forming the end plate member includes the steps of forming a metal insert and insert molding the metal insert into the end plate member.

* * * * *